Figure 1:
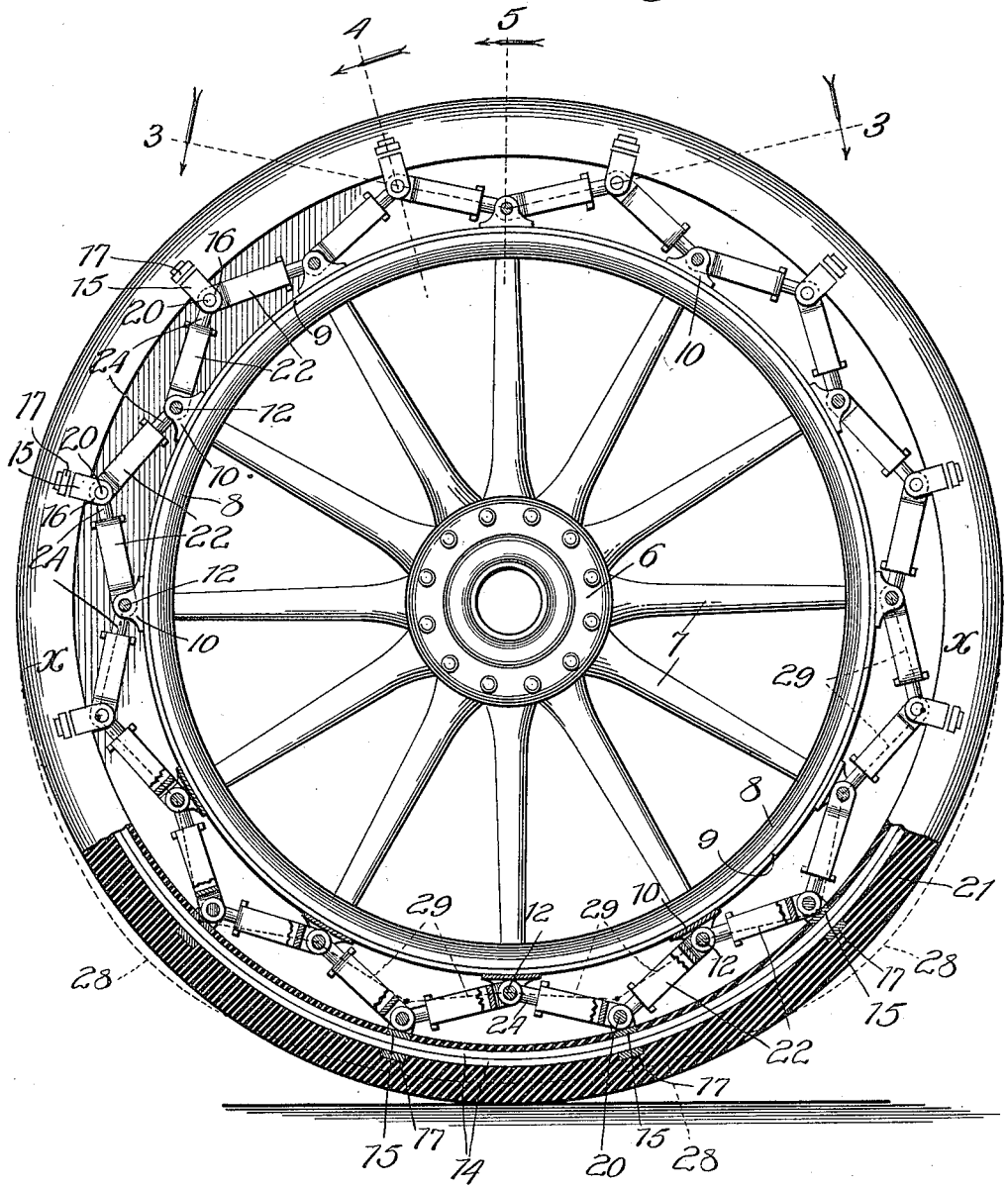

W. H. FAHRNEY.
SPRING VEHICLE WHEEL.
APPLICATION FILED NOV. 14, 1912.

1,075,637.

Patented Oct. 14, 1913.
2 SHEETS—SHEET 1.

Witnesses:
Inventor:
William H. Fahrney,
By Dyrenforth, Lee, Chritton & Wiles,
Atty's W. H. FAHRNEY.
SPRING VEHICLE WHEEL.
APPLICATION FILED NOV. 14, 1912.
1,075,637.
Patented Oct. 14, 1913.
2 SHEETS—SHEET 2.
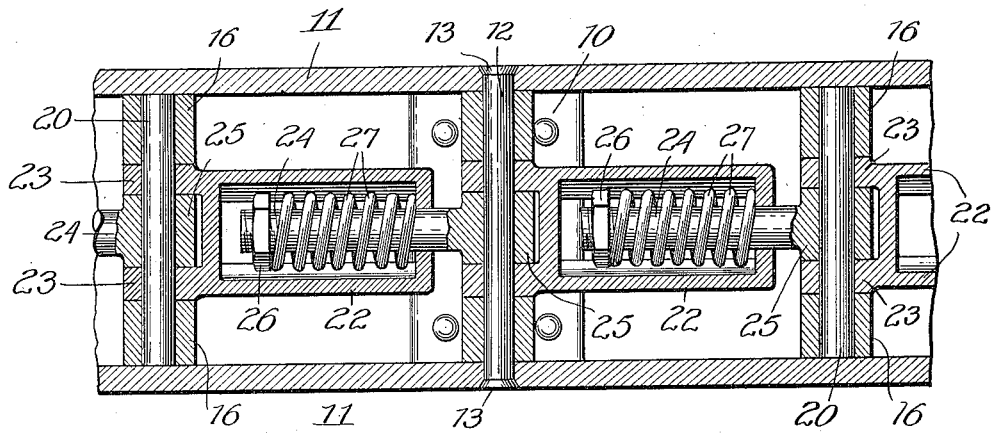
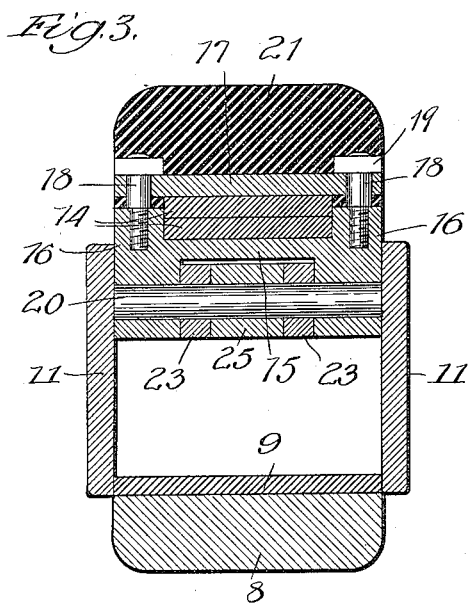
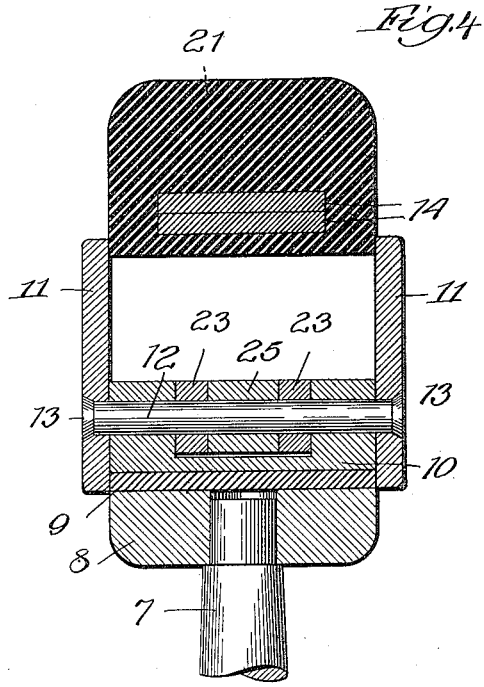
Witnesses:
Inventor.
William H. Fahrney,

UNITED STATES PATENT OFFICE.

WILLIAM H. FAHRNEY, OF CHICAGO, ILLINOIS.

SPRING VEHICLE-WHEEL.

1,075,637.  Specification of Letters Patent.  Patented Oct. 14, 1913.

Application filed November 14, 1912. Serial No. 731,445.

*To all whom it may concern:*

Be it known that I, WILLIAM H. FAHRNEY, a citizen of the United States, residing at Chicago, in the county of Cook and State of Illinois, have invented a new and useful Improvement in Spring Vehicle-Wheels, of which the following is a specification.

My invention relates to an improvement in the class of spring-vehicle wheels employing annular plates secured to the wheel-rim near its edges and surrounded by a flexible or resilient tire, with one or more annular band-springs confined, in spaced relation to the rim, between the latter and the tire and connected at intervals by yielding means with the rim to permit the annular spring or springs to flex under the stresses of the load.

The object of my invention is to provide a construction of the connection between the band-spring and rim which shall, in the running of the wheel, permit the spring to flex freely throughout the section thereof below the horizontal diameter of the wheel.

In the accompanying drawings, Figure 1 shows my improved wheel by a view in side elevation with one of the annular plates omitted and a portion of the tire broken away to disclose the construction of the spring and rim connecting-means, shown partly broken and in section; Fig. 2 is an enlarged section on the irregular line 3—3, Fig. 1, and Figs. 3 and 4 are sections taken, respectively, on the lines 4 and 5, Fig. 1, and enlarged.

The wheel-center may be of any desired construction. That shown comprises a hub 6, spokes 7 and a felly 8 provided with a rim 9. At intervals about the rim, to register with the spokes, are secured clips 10, of general U-shape, to the ends of which annular metal side-plates 11 are rigidly fastened against the edges of the rim by pins 12 passing through the clips and annular plates and secured preferably by having their ends riveted in the latter, as shown at 13, Fig. 4. An annular band-spring 14, shown to be formed of two endless bands, one within the other, surrounds the rim in spaced relation thereto and carries, at intervals to place them midway between the clips on the rim, clips 15 substantially like the rim-clips, but formed on their outer faces with end-lugs 16 to embrace at its edges the band-spring, to which each clip is clamped by a cross-strip 17 through the medium of screw-studs 18 passing through the strip near its ends into the lugs and fastened by heads 19 on their outer ends. A pin 20 extends transversely through the inner yoke-like end of each clip 15. The tire 21 is preferably rubber molded about and thus embedding the spring 14. Each clip 15 is connected at its pin 20 with the adjacent clip 10 at its pin 12 by a spring-plunger and cylinder device (Fig. 2) extending diagonally between the clips. The cylinders or guide-housings 22 have each a pair of perforated arms 23 on one head, at which they are pivotally supported alternately on the pins 20 and 12, and plungers 24 work in them through their opposite heads and terminate at their outer ends in perforated heads 25 at which they are pivoted alternately on the pins 12 and 20, between the cylinder-arms thereon. Thus the band-spring and wheel-rim are connected at staggered pivot-points 12, 20, by a zig-zag series of pivoted cylinders and plungers in the intervening space bound by the annular plates 11. On each plunger is confined between a nut 26 on its inner end and a cylinder head a spiral compression-spring 27, these springs forming the essential housed pivotal connection between the wheel-rim and annular band-spring.

In the running of a wheel of the described construction, the flexure of the spring 14 (and of the tire embedding it) is that indicated by the dotted line 28 in Fig. 1 extending between the points *x—x*, whereby the cylinders 22 between those points below the horizontal diameter of the wheel are turned to the relative positions indicated by the dotted lines 29, thus forcing their plungers 24 inwardly, or into the cylinders, and bringing the centers 12 and 20 nearer together to permit the springs 27 in these cylinders, to expand; while the similar springs in the remaining cylinders about the wheel-rim tend to resist that flexure and distribute over the spring 14 the stresses of the load, thereby rendering the wheel resiliently cushioning in a high degree.

I realize that considerable variation is possible in the details of construction thus specifically shown and described, and I do not intend by illustrating a single specfic, or preferred form, to limit my invention thereto; my intention being in the appended claims to claim protection upon all the novelty there may be in the device as broadly as the state of the art will permit.

What I claim as new and desire to secure by Letters Patent is—

1. In a spring vehicle-wheel, the combination with a wheel-center, of an annular band-spring about the rim in spaced relation thereto, spring-housings pivotally connected at staggered intervals respectively with the band-spring and rim and extending in a plane parallel with the plane of the wheel plungers pivotally connected at staggered intervals respectively with the rim and band-spring and working in the housings, and compression springs confined in the housings about the plungers, said housed springs forming a zig-zag circumferential series in the space separating the rim and band-spring.

2. In a spring vehicle-wheel, the combination with a wheel-center, of an annular band-spring about the rim in spaced relation thereto, a series of clips about the rim and a series of clips about the band-spring in staggered relation to those about the rim, pivot-pins on the clips, spring-housings having arms on one end at which they are pivotally supported on said clip-pins on the band-spring and rim in succession and extending in a plane parallel with the plane of the wheel plungers working in said housings and having heads on their outer ends at which they are pivotally supported on the clip-pins on the rim and band-spring in succession to extend between the housing-arms thereon, and compression-springs confined in the housings about the plungers, said housed springs forming a zig-zag circumferential series in the space separating the rim and band-spring.

3. In a spring vehicle-wheel, the combination with a wheel-center, of an annular band-spring about the rim in spaced relation thereto, spring-housings pivotally connected at staggered intervals respectively with the band-spring and rim, plungers having nuts on their inner ends and pivotally connected at staggered intervals respectively with the rim and band-spring and working in the housings, and compression springs about the plungers between the nuts on the ends thereof and the plunger receiving end of the housings, said springs forming a zigzag circumferential series in the space separating the rim and band-spring.

WILLIAM H. FAHRNEY.

In presence of—
NELLIE B. DEARBORN,
OTTILIE C. AVISUS.

---

Copies of this patent may be obtained for five cents each, by addressing the "Commissioner of Patents, Washington, D. C."